TIMED INHIBIT CIRCUIT

Filed Sept. 5, 1961 2 Sheets-Sheet 1

INVENTOR.
EDWIN S. LEE, III
BY
Christie, Parker & Hale
ATTORNEYS.

TIMED INHIBIT CIRCUIT

Filed Sept. 5, 1961

2 Sheets-Sheet 2

INVENTOR.
EDWIN S. LEE, III
BY
Christie, Parker & Hale
ATTORNEYS.

United States Patent Office 3,123,719

Patented Mar. 3, 1964

3,123,719

TIMED INHIBIT CIRCUIT

Edwin S. Lee III, San Gabriel, Calif., assignor to Burroughs Corporation, Detroit, Mich., a corporation of Michigan Filed Sept. 5, 1961, Ser. No. 136,052

11 Claims. (Cl. 307—88)

This invention relates to electronic circuits and more particular to time delay circuits employing magnetic cores.

Time delay circuits generally employ capacitor timing circuits for generating the required delay signals. Initially the time delay circuit is triggered causing the capacitor to start discharging and a delay signal to be developed. Then, in order for the timing circuit to operate properly, time must be allowed for the capacitor to recharge before the next cycle of operation can be initiated. In many applications it is undesirable to allow this recharge or recovery time because it is necessary to develop another time delay signal immediately at the termination of the previous one.

In contrast, the present invention provides a time delay circuit employing a magnetic core which provides a continuous time delay signal during the desired delay interval and does not require any recovery time. Also, the present invention provides a delay circuit whose delay time may be adjusted simply by changing the value of a single resistor in the circuit.

Briefly, a specific embodiment of the present invention comprises a saturable magnetic core having set and reset saturable magnetic conditions. A plurality of windings are magnetically coupled to the core including reset, set, and feedback windings. A bias circuit is connected to the reset winding for normally tending to reset the core. A switching circuit is coupled to the set winding and is responsive to an applied input signal to develop a signal tending to set the core. A feedback circuit is connected between the feedback winding and the input of the switching circuit. As soon as the switching circuit applies a signal to the set winding, a signal is developed in the feedback winding tending to maintain the switching circuit in the condition wherein it provides the signal to the set winding. A gating circuit is coupled to be responsive to the reset and set signals to provide an output signal. A switching circuit is coupled to be responsive to the output signal of the gating circuit to provide the delayed output signal.

These and other features of the present invention may be more fully understood with reference to the following description of the figures of which:

FIGURE 2–A is a diagram illustrating the hysteresis loop of the magnetic core and windings of FIG. 2.

Figure 1:
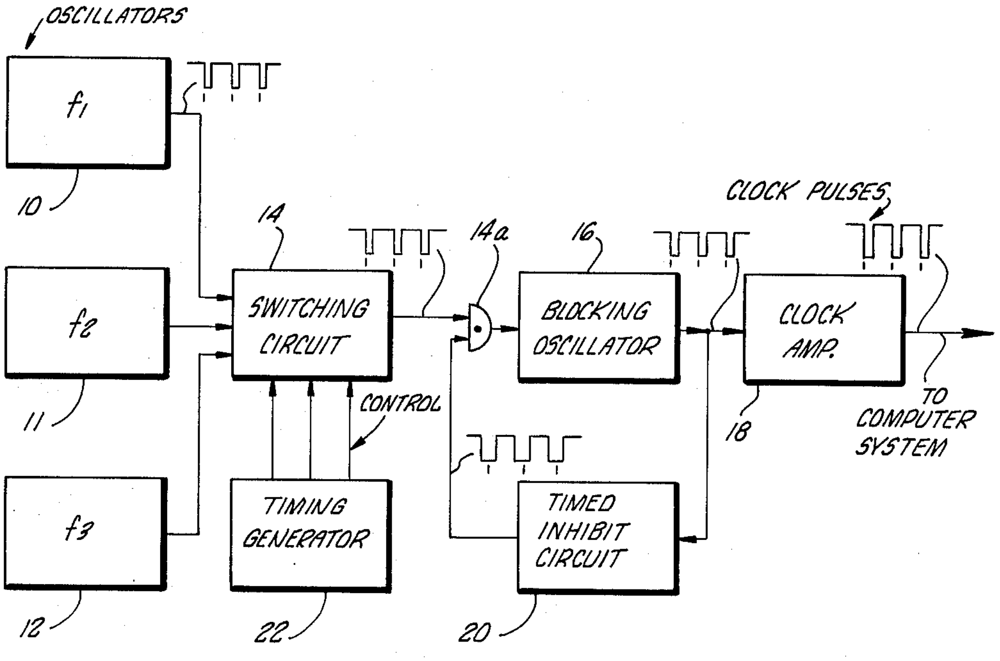
FIGURE 1 is a general block diagram of a clock system for a computer and employing the present invention.

Refer now to the clock system of FIG. 1 which embodies the present invention. Three oscillators, 10, 11, and 12, have output circuits connected through a switching circuit 14 and a gating circuit 14*a* to the input of a blocking oscillator 16. The output circuit of the blocking oscillator 16 is connected to the input circuits of both a clock amplifier 18 and a timed inhibit circuit 20. The output circuit of the timed inhibit circuit 20 is connected to another input circuit of the gating circuit 14*a*. A timing generator 22 provides control signals to the switching circuit 14.

The three oscillators 10, 11 and 12, are conventional free running oscillator circuits which have differentiating and wave shaping output circuits for providing negative output pulses at a repetition rate equal to the frequency of the oscillator. The three oscillator circuits, 10, 11, and 12, each have different frequencies, designated $f_1$, $f_2$, and $f_3$, respectively. The switching circuit 14 is operative to separately couple the output pulses of the oscillator circuits, 10, 11, and 12, to the input circuit of the gating circuit 14*a*. The control signals developed by the timing generator 22 determine which oscillator circuit is to have its output pulses connected to the gating circuit 14*a*.

The gating circuit 14*a* is an "and" type gating circuit which requires a negative input signal at both of its input circuits in order to develop a negative output pulse. Although the gate 14*a* is shown separately by way of example, it actually forms a part of the switching circuit 14.

Whenever the switching circuit 14 couples the negative output pulse of one of the oscillators to the gating circuit 14*a* in coincidence with a negative output pulse from the timed inhibit circuit 20, the gating circuit 14*a* provides a negative input pulse to the blocking oscillator 16. The blocking oscillator 16 is responsive to a negative input pulse to develop a negative output pulse having a constant pulse width.

The clock amplifier 18 amplifies the amplitude of the negative output pulses from the blocking oscillator 16 and provides output or timing pulses called clock pulses, for operating the various circuits in the computer system for which the clock system of FIG. 1 is provided.

The function of the timed inhibit circuit 20 in the clock system of FIG. 1 is important and will now be explained. The operation of the oscillator circuits 10, 11 and 12 is asynchronous. Therefore, the timing generator 22 may signal the oscillator selection switching circuit 14 for switching the input circuit of the gating circuit 14*a* from the output of one to another as a latter oscillator is starting to develop an output pulse and immediately after the first has just developed an output pulse. The gating circuits, the trigger circuits, and other digital circuits in the computer system require a minimum time interval to recover after receiving a clock pulse. The timed inhibit circuit 20 insures that the minimum time interval lapses after the termination of one clock pulse before the next one can be developed.

The output of the timed inhibit circuit 20 is normally at a low potential, however, a negative input pulse causes a high potential output pulse therefrom with the pulse width slightly shorter than the time interval between the beginnings of two negative pulses from the oscillator circuit which has the highest frequency. This time interval is sufficient for the circuits of the computer system to recover after receiving a clock pulse.

Refer now to the operation of the clock system of FIG. 1. Assume the switching circuit 14 is initially connected to the oscillator 10, the output signal of the timed inhibit circuit 20 is a negative potential, and the oscillator 10 develops a negative output pulse. The blocking oscillator 16 pulses the timed inhibit circuit 20 causing it to provide a positive output pulse. This positive output pulse is applied to the input of the gating circuit 14*a*.

Assume now that while the timed inhibit circuit 20 is developing a positive output pulse, the switching circuit 14 disconnects the gate 14*a* from the oscillator circuit 10 and connects it to pulses from the oscillator circuit 11. Also assume that the oscillator circuit 11 immediately starts developing a negative output pulse. Since the timed inhibit circuit 20 is developing a positive output pulse it inhibits the pulse from oscillator circuit 11 from being applied to the blocking oscillator 16. When the delay of the timed inhibit circuit 20 is over, its output signal returns to a negative potential and allows the next negative output pulse from the oscillator circuit 11 to pulse the blocking oscillator 16 and a clock pulse to be developed.

Figure 2A:
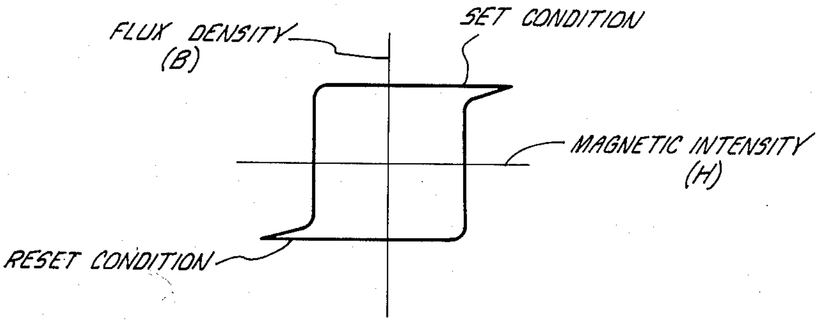
FIGURE 2 is a schematic diagram of a timed inhibit circuit for use in the clock system of FIG. 1 and embodying the present invention.
Figure 2:
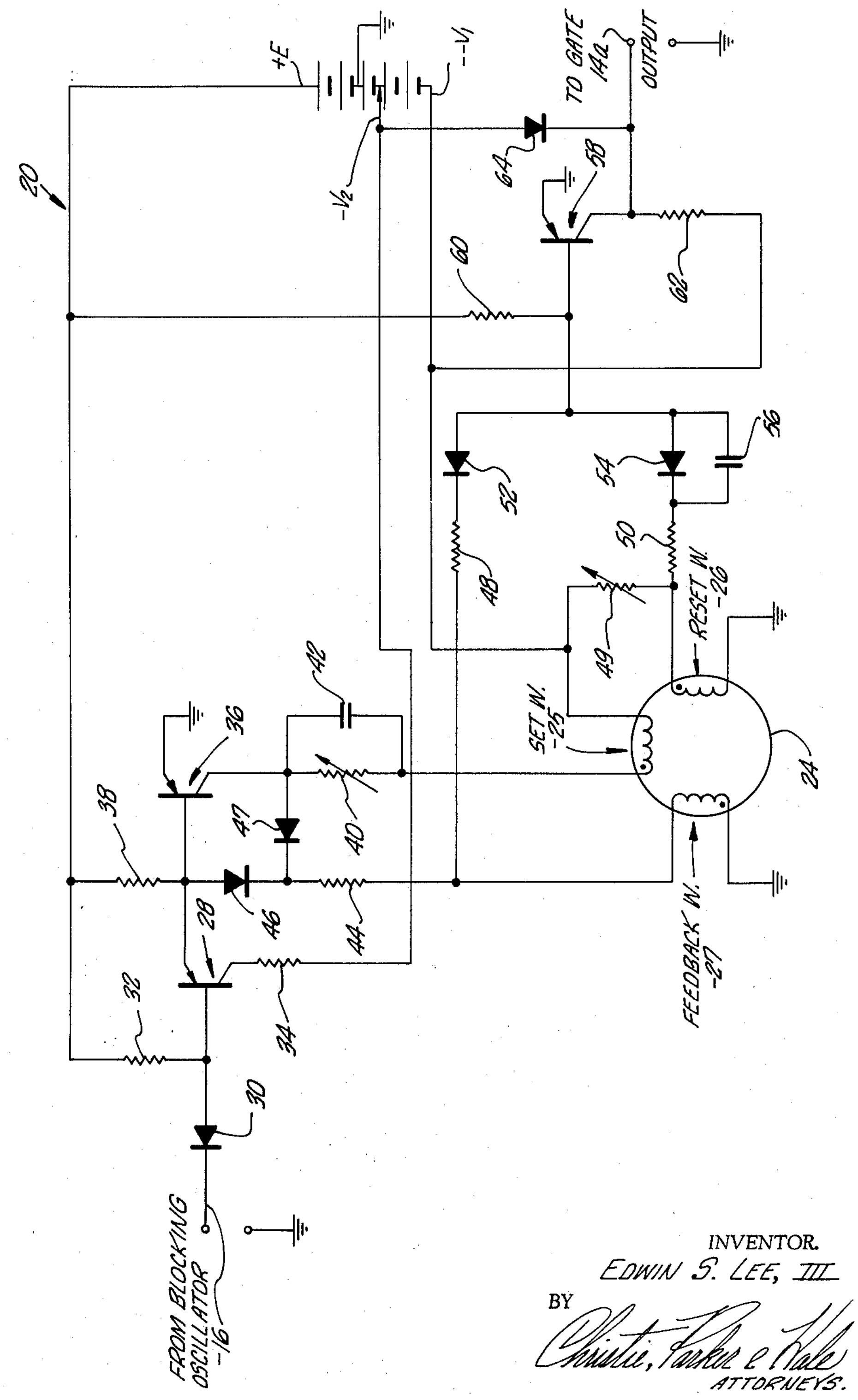

Refer now to the schematic diagram of the timed inhibit circuit 20 shown in FIG. 2. In the following discussion three power supplies are referred to. These power supplies are represented by the symbols $--V_1$, $-V_2$, and +E. The power supplies $--V_1$ and $-V_2$ are negative power supplies and the negative power supply $--V_1$ has a greater negative output signal than the negative power supply $-V_2$. The power supply +E is a positive power supply.

A magnetic core 24 is provided having three windings called the set winding 25, the reset winding 26, and the feedback winding 27. The magnetic core 24 and associataed windings have a conventional square-loop type of hysteresis characteristic such as that shown in FIG. 2–A. The core 24 has two saturable magnetic conditions called set and reset conditions.

A switching circuit is provided including a PNP-type transistor 28, a silicon diode 30, a bias resistor 32, and a load resistor 34. The PNP transistor 28 has its base electrode connected to the anode of the diode 30 and one end of the resistor 32, and its collector electrode connected through the resistor 34 to the negative power supply $-V_2$. The cathode of the diode 30 and the other end of the resistor 32 are connected to the output of the blocking oscillator 16 and the output of the positive power supply +E, respectively.

Another switching circuit is provided including a PNP transistor 36, a bias resistor 38, an adjustable load resistor 40, and a speed-up capacitor 42. The PNP transistor 36 has its base electrode connected through the bias resistor 38 to the output of the positive power supply +E, its emitter electrode connected to ground (zero volts potential), and its collector electrode connected through the variable load resistor 40 to one end of the set winding 25. The speed-up capacitor 42 is connected in parallel with the load resistor 40.

A feedback circuit is provided including a resistor 44 and a silicon diode 46. The resistor 44 and the diode 46 are connected in series between the base electrode of the transistor 36 and one end of the feedback winding 27. The other end of the feedback winding 27 from the resistor 44 is connected to ground.

Germanium diode 47 is provided having its anode and cathode electrodes connected to the collector electrode of the transistor 36 and the cathode of the diode 46, respectively. The diode 47 is a conventional anti-saturation diode for the transistor 36.

A reset circuit is also provided comprising an adjustable resistor 49 connected between the output of the negative power supply $--V_1$ and one end of the reset winding 26. The other end of the reset winding 26 from the variable resistor 49 is connected to ground.

The windings 27, 25 and 26 are poled with like polarity terminals connected to ground, resistor 40, and resistor 49, respectively.

An "or" type gating circuit is also provided comprising resistors 48 and 50, diodes 52 and 54, and a capacitor 56. The resistor 48 and diode 52 are connected in series with one end of the resistor 48 connected to the junction formed by the feedback resistor 44 and the feedback winding 27. The resistor 50 and diode 54 are also connected in series with one end of the resistor 50 connected to the junction formed by the adjustable resistor 49 and the reset winding 26. The diodes 52 and 54 are poled with their cathodes connected to the resistors 48 and 50 and their anodes connected in common. The capacitor 56 is connected in parallel with the diode 54.

A switching circuit is connected to the "or" gating circuit and comprises a PNP-type transistor 58, a bias resistor 60, a load resistor 62, and a limiting diode 64. The transistor 58 has its emitter electrode connected to ground, its base electrode connected through the bias resistor 60 to the output of the positive power supply +E and its collector electrode connected through the load resistor 62 to the output of the negative power supply $--V_1$. The diode 64 has its cathode and anode electrodes connected to the collector electrode of the transistor 58 and the output circuit of the negative power supply $-V_2$, respectively. The output of the timed inhibit circuit 20 is at the collector electrode of the transistor 58.

With the elements of the timed inhibit circuit 20 of FIG. 2 in mind, refer now to its operation. Assume initially the timed inhibit circuit 20 is in a quiescent condition wherein the core 24 is in a reset condition, the signal applied to the cathode of the diode 30 is at ground potential and an input pulse has not occurred. The resistor 32 applies a reverse bias signal to the transistor 28 biasing it into a non-conductive condition. Similarly, the bias resistor 38 applies a reverse bias signal to the transistor 36 biasing it into a non-conductive condition. Also, since the transistor 36 is in a non-conductive condition, no current flows through the set winding 25. However, current is flowing from ground to the $--V_1$ power supply via the reset winding 26 and the variable resistor 49. The reset winding 26 is poled such that the current flowing therethrough tends to further saturate the core 24 in a reset condition, and thus has no effect on the magnetic condition of the core 24. As a result, the potentials across the windings 25, 26 and 27 are essentially at ground potential. The bias resistor 60 biases the transistor 58 into a non-conductive condition. This causes the output signal at the collector electrode of the transistor 58 to tend to drop towards the output signal from the negative power supply $--V_1$. However, the limiting diode 64 is forward biased and clamps the potential at a potential essentially equal to that of the negative power supply $-V_2$.

Assume now that a negative input pulse is applied at the cathode of the diode 30. This causes the base of the transister 28 to drop to a negative potential and switch it into a conductive condition. The transistor 28 amplifies the signal applied to its base electrode and applies the signal to the base electrode of the transistor 36, thereby switching it into conduction. When the transistor 36 switches into conduction, current initially flows from ground to the negative power supply $--V_1$ via the transistor 36, capacitor 42, and the set winding 25. However, as the capacitor 42 charges, current starts flowing through the adjustable resistor 40. When the capacitor 42 is completely charged, all the current to the set winding 25 flows through the adjustable resistor 40. The current flowing through the set winding 25 is in a direction which tends to force the core 24 towards a set condition. The signal applied across the set winding 25 is essentially a voltage signal and causes a voltage signal to be induced in the feedback winding 27.

The feedback winding 27 is poled such that the signal induced therein is negative at the junction of resistors 44 and 48 with respect to ground. The negative feedback potential applied to the resistor 44 maintains current flow through the emitter to base junction of the transistor 36. This maintains transistor 36 in a conductive condition even after the input pulse terminates. It should be noted that the function of resistor 44 is to prevent excessive current flow through the emitter to base junction of transistor 36 when the negative feedback pulse is induced in feedback winding 27.

The negative feedback pulse applied to the resistor 48 also causes the diode 52 to become forward biased and cause the potential on the base electrode of the transistor 58 to drop to a negative potential. The negative potential applied to the base electrode of the transistor 58 causes it to switch into a conductive condition. The output signal at the collector electrode of the transistor 58 then rises to essentially ground potential, or a high potential level (neglecting the emitter to collector potential drop).

The reset winding 26 is poled such that a positive or a high potential signal is applied at the resistor 49 with respect to ground. This overcomes the effect of the reset signal applied through the adjustable resistor 49 by the $--V_1$ power supply. The signal induced in the reset winding 26 then causes the capacitor 56 to charge with a positive potential on the plate connected to resistor 50 with respect to the plate connected to the base electrode of the transistor 58.

The voltage across the winding 25 subsequently causes the core 24 to saturate in a set condition and the potentials across the set winding 25, the feedback winding 27, and the reset winding 26 all drop to zero. However, the charge on the capacitor 56 causes current to continue flowing from the base electrode of the transistor 58 to ground via the resistor 50 and the reset winding 26. Thus, the transistor 58 remains in a conductive condition and the output potential at the collector electrode of the transistor 58 remains at ground potential.

Thus the capacitor 56 prevents any drop in the output potential in between the set and reset operations on the core. This allows a continuous high potential output signal during both the set and reset cycles.

Current then starts flowing to the negative power supply $--V_1$ from ground via the reset winding 26 and the resistor 49, causing the core 24 to start being saturated toward a reset condition. A negative potential is then developed at the resistor 50 end of the reset winding 26 with respect to ground causing current to continue flowing from the transistor 58 to ground via the diode 54, resistor 50, and the reset winding 26 after capacitor 56 has discharged.

When the core saturates in a reset condition the voltage developed across the reset winding 26 drops to zero. This causes the base electrode of the transistor 58 to rise to a high potential and the transistor 58 is switched into a non-conductive condition. When the transistor 58 is in a non-conductive condition, the potential at its collector electrode is again at a negative or low potential level, the timed inhibit circuit 20 is in a quiescent condition ready for another negative input pulse from the blocking oscillator 16 to cause it to generate another high potential or delayed output signal.

There are many rearrangements of the timed inhibit circuit 20 that are within the scope of the present invention; for example, the transistor 28 and associated circuits are not necessary if the source of input pulses has sufficient driving power to reliably drive the transistor 36 into conduction. Also by way of example, diode 46 is not essential but may be replaced by a short circuit by increasing the impedance of resistor 44, and also the anti-saturation diode 47 may be removed as it is not essential to the operation of the timed inhibit circuit 20. In addition, the resistors 48 and 50 are provided to prevent over-driving of transistor 58 and may be replaced by a short circuit if the driving voltages are of the proper values.

What is claimed is:

1. A time delay circuit adapted for forming a delay pulse of predetermined pulse width substantially immediately upon termination of a preceding delay pulse comprising a magnetic core having at least two stable states characterized as reset and set magnetic states, a plurality of windings magnetically coupled to said core and including at least reset, set and feedback windings, means connected for normally providing a signal to said reset winding tending to reset said core, switching means coupled to be responsive to an applied input signal to provide a signal to said set winding tending to set said core, a feedback circuit connected to be responsive to signals induced in said feedback winding during the time said core is being set for applying an input signal to said switching means and thereby maintaining the signal to said set winding, and means comprising asymmetrical conductive means coupled to be responsive to the signals tending to set and to reset said core for providing a predetermined output signal.

2. In a timing system, the combination which comprises a magnetic core having at least two stable states characterized as reset and set magnetic states, a plurality of windings magnetically coupled to said core and including at least reset, set and feedback windings, means connected for normally providing a signal to said reset winding tending to reset said core, a source of pulses, switching means coupled to be responsive to the pulses from said source to provide a signal to said set winding tending to set said core, a feedback circuit connected to be responsive to signals induced in said feedback winding during the time said core is being set for applying an input signal to said switching means for maintaining the signal to said set winding, and means comprising asymmetrical conductive means coupled to be responsive to the signals tending to set and to reset said core for providing a predetermined output signal.

3. A timing circuit comprising a magnetic core having at least two saturable states characterized as set and reset magnetic conditions, a plurality of windings magnetically coupled to said core comprising reset, set, and feedback windings, means connected for normally applying a signal to said reset winding tending to reset said core, first switching means having first and second conductive conditions and a control circuit, said first switching means being normally in said second conductive condition and coupled to be responsive to an input signal applied to said control circuit for switching into the first conductive condition thereof for applying a signal to said set winding tending to set said core and thereby induce a signal in said feedback winding, impedance means connected for coupling the signals induced in said feedback winding back to said first switching means and thereby maintaining same in the first conductive condition, gating means coupled to be responsive to signals developed in said feedback winding and said reset winding during the time intervals said core is being set and reset for developing an output signal, and second switching means coupled to be responsive to the output signal of said gating means for developing a predetermined output signal.

4. A timing circuit comprising a magnetic core having at least two saturable states characterized as reset and set conditions, a plurality of windings magnetically coupled to said core comprising at least reset, set and feedback windings, means connected for normally applying a signal to said reset winding tending to reset said core, first switching means having first and second conductive conditions and a control circuit, said first switching means normally arranged in said second conductive condition and coupled to be responsive to an input signal applied to said control circuit for switching into the first conductive condition thereof for applying a signal to said set winding tending to set said core and for inducing a signal in said feedback winding, impedance means connected for coupling the signal induced in said feedback winding back to the control circuit of said first switching means for maintaining same in the first conductive condition, an "or" type gating circuit connected to be responsive to signals developed in said feedback winding and said reset winding during the time intervals said core is being set and reset to thereby provide an output signal, and second switching means coupled to be responsive to the output signal of said gating circuit for developing a predetermined output signal.

5. A timing circuit comprising a magnetic core having at least two saturable states characterized as set and reset saturable magnetic states and normally arranged in said reset state, a plurality of windings magnetically coupled to said core comprising at least reset, set and feedback windings, means connected for normally applying a signal to said reset winding tending to reset said core, a transistor switching circuit having first and second conductive conditions and a control circuit and normally arranged in said second conductive condition, said switching circuit being coupled to be responsive to signals applied to the control circuit thereof for switching into said first conductive condition for thereby developing a set signal, an impedance element connected for coupling said set signal to said set winding thereby tending to set said core and for inducing a signal in said feedback winding, impedance means connected for coupling the signal induced in said feedback winding to said switching circuit for maintaining same in the first conductive condition thereof, an "or" type gating circuit connected to be responsive to signals developed in said feedback winding and said reset winding during the time intervals said core is being set and reset to thereby provide an output signal, and switching means coupled to be responsive to the output signal of said gating circuit for developing a predetermined output signal.

6. A timing circuit as defined in claim 5, wherein said "or" type gating circuit comprises first and second unilateral conductive elements separately coupled to said set and feedback windings, and a capacitive element coupled across at least one of said unilateral conductive elements for maintaining a continuous output signal in between the times said core is being set and reset.

7. A timing circuit comprising a magnetic core having at least two saturable states characterized as set and reset saturable magnetic states, a plurality of windings magnetically coupled to said core comprising reset, set and feedback windings, a first impedance element connected for normally applying a signal to said reset winding tending to reset said core, at least one transistor element having base, emitter and collector electrodes, a second impedance element coupled to said base electrode for normally biasing said transistor element into a first conductive state, said transistor being responsive to an applied input signal overcoming said bias for switching into a second conductive state and thereby developing an output signal at the collector and emitter electrode circuit thereof, a third impedance element connected for coupling the output signal of said transistor to said set winding for tending to set said core and for inducing a signal in said feedback winding, a feedback circuit connected for coupling the signal induced in said feedback winding to said base electrode for maintaining said transistor in the second conductive state thereof, a gating circuit coupled to said reset and feedback windings for developing a predetermined output signal in response to signals developed therein, and a switching circuit connected to be responsive to the output signal of said gating circuit for developing a predetermined output signal.

8. A timing circuit as defined in claim 7, wherein said gating circuit comprises first and second unilateral conductive elements separately coupled to said reset and feedback windings, and a capacitive element coupled across at least one of said unilateral conductive elements for maintaining a continuous output signal in between the times said core is being set and reset.

9. A timing circuit as defined in claim 8 wherein said feedback circuit comprises the series connection of an impedance element and means for applying a predetermined bias signal to said base electrode.

10. A timing circuit as defined in claim 8 wherein said switching circuit comprises a second transistor element, including a base electrode and an emitter and collector electrode circuit, a separate impedance element connected for applying a first bias signal to the collector and emitter electrode circuit of said second transistor element, and a unilateral conductive element connected for applying a second bias signal to the collector and emitter electrode circuit of said second transistor element.

11. In a clock system the combination of which comprises a blocking oscillator circuit connected to be responsive to an applied input signal for developing a clock pulse signal, a time delay circuit comprising a saturable core having at least two saturable states characterized as reset and set saturable magnetic conditions, a plurality of windings magnetically coupled to said core and including at least reset, set and feedback windings, means connected for normally providing a signal to said reset winding tending to reset said core, switching means coupled to be responsive to said clock pulse signal for providing a signal to said set winding tending to set said core, a feedback circuit connected to be responsive to signals induced in said feedback winding during the time said core is being set for applying an input signal to said switching means for maintaining the signal to said set winding and means coupled to be responsive to the signals tending to set and to reset said core for developing a predetermined output signal, a plurality of oscillator circuits, a switching circuit connected to be responsive to applied control signals for individually coupling the signals developed by said oscillator circuits to the input circuit of said blocking oscillator circuit and connected to be responsive to the presence of the signal developed by said means for providing a predetermined output signal for inhibiting any signals from being applied to said blocking oscillator circuit.

No references cited.